US010719741B2

(12) United States Patent
Park et al.

(10) Patent No.: US 10,719,741 B2
(45) Date of Patent: Jul. 21, 2020

(54) SENSORY INFORMATION PROVIDING APPARATUS, VIDEO ANALYSIS ENGINE, AND METHOD THEREOF

(71) Applicant: ELECTRONICS AND TELECOMMUNICATIONS RESEARCH INSTITUTE, Daejeon (KR)

(72) Inventors: Noh Sam Park, Daejeon (KR); Hoon Ki Lee, Daejeon (KR); Mi Kyong Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 233 days.

(21) Appl. No.: 15/889,870

(22) Filed: Feb. 6, 2018

(65) Prior Publication Data

US 2018/0232606 A1    Aug. 16, 2018

(30) Foreign Application Priority Data

Feb. 10, 2017  (KR) .................. 10-2017-0018978

(51) Int. Cl.
*G06K 9/66* (2006.01)
*G06N 3/04* (2006.01)
(Continued)

(52) U.S. Cl.
CPC ........... *G06K 9/66* (2013.01); *G06K 9/00765* (2013.01); *G06K 9/4628* (2013.01); *G06K 9/627* (2013.01);
(Continued)

(58) Field of Classification Search
CPC ...... G06K 9/00765; G06K 9/66; G06K 9/627; G06K 9/4628; G06K 9/6256; G06N 3/04;
(Continued)

(56) References Cited

U.S. PATENT DOCUMENTS

2011/0125788 A1   5/2011  Joo et al.
2016/0098592 A1*  4/2016  Lee .................. G06F 19/321
                                                    434/236
(Continued)

FOREIGN PATENT DOCUMENTS

KR    10-2013-0067649 A    6/2013
KR    10-2014-0035713 A    3/2014
(Continued)

OTHER PUBLICATIONS

Choi, et al. (Streaming Media with Sensory Effect), pp. 1-6, IEEE. (Year: 2011).*

*Primary Examiner* — Daniel G Mariam (57) ABSTRACT

Disclosed is a sensory information providing apparatus. The sensory information providing apparatus may comprise a learning model database storing a plurality of learning models related to sensory effect information with respect to a plurality of videos; and a video analysis engine generating the plurality of learning models by extracting sensory effect association information by analyzing the plurality of videos and sensory effect meta information of the plurality of videos, and extracting sensory information corresponding to an input video stream by analyzing the input video stream based on the plurality of learning model.

20 Claims, 8 Drawing Sheets

(51) Int. Cl.
  *G06N 3/08* (2006.01)
  *G06K 9/62* (2006.01)
  *G06K 9/00* (2006.01)
  *G06K 9/46* (2006.01)

(52) U.S. Cl.
  CPC ............. *G06K 9/6256* (2013.01); *G06N 3/04* (2013.01); *G06N 3/0445* (2013.01); *G06N 3/0454* (2013.01); *G06N 3/08* (2013.01); *G06N 3/084* (2013.01)

(58) Field of Classification Search
  CPC ........ G06N 3/08; G06N 3/084; G06N 3/0445; G06N 3/0454; G06N 20/00
  USPC .................................................. 382/156–159
  See application file for complete search history.

(56) References Cited

U.S. PATENT DOCUMENTS

| | | |
|---|---|---|
| 2016/0182771 A1 | 6/2016 | Oh |
| 2016/0259994 A1 | 9/2016 | Ravindran et al. |
| 2016/0260014 A1 | 9/2016 | Hagawa et al. |
| 2016/0284095 A1 | 9/2016 | Chalom et al. |
| 2016/0293213 A1* | 10/2016 | Kim ................... G11B 27/036 |
| 2017/0013205 A1* | 1/2017 | Yang ................... H04N 5/2621 |
| 2017/0046309 A1* | 2/2017 | Hubauer ............ G05B 19/0425 |
| 2017/0293356 A1* | 10/2017 | Khaderi ................ A63F 13/212 |
| 2018/0060757 A1* | 3/2018 | Li ........................ G06K 9/6256 |
| 2019/0228571 A1* | 7/2019 | Atsmon ............... G05D 1/0088 |

FOREIGN PATENT DOCUMENTS

| KR | 10-1558653 B1 | 10/2015 |
|---|---|---|
| KR | 10-2016-0068516 A | 6/2016 |
| KR | 10-2016-0088224 A | 7/2016 |
| KR | 10-1657495 B1 | 9/2016 |

* cited by examiner

| filename | effect | object/event | pts | duration | intensity | position | direction | color |
|---|---|---|---|---|---|---|---|---|
| A_GOOD_DAY_TO_DIE_HARD_DVS608 | light | | 4000 | 2000 | 30 | | front | blue |
| A_GOOD_DAY_TO_DIE_HARD_DVS610 | | | | | | | | |
| A_GOOD_DAY_TO_DIE_HARD_DVS662 | wind | | 3000 | 5000 | 30 | | left-right | |
| A_GOOD_DAY_TO_DIE_HARD_DVS665 | | | | | | | | |
| A_GOOD_DAY_TO_DIE_HARD_DVS666 | | | | | | | | |
| A_GOOD_DAY_TO_DIE_HARD_DVS667 | light | | 6900 | 2200 | 30 | | left-right | yellow |
| A_GOOD_DAY_TO_DIE_HARD_DVS676 | | | | | | | | |
| A_GOOD_DAY_TO_DIE_HARD_DVS797 | flash | | 400 | 300 | | | | |
| A_GOOD_DAY_TO_DIE_HARD_DVS797 | vibration | | 1000 | 3000 | | | | |
| A_GOOD_DAY_TO_DIE_HARD_DVS797 | flash | | 2600 | 3500 | | | | |
| A_GOOD_DAY_TO_DIE_HARD_DVS797 | vibration | | 6600 | 800 | | | | |
| A_GOOD_DAY_TO_DIE_HARD_DVS797 | flash | | 8300 | 300 | | | | |
| A_GOOD_DAY_TO_DIE_HARD_DVS815 | flash | | 400 | 500 | | | | |
| A_GOOD_DAY_TO_DIE_HARD_DVS815 | vibration | | 1200 | 1200 | | | | |
| A_GOOD_DAY_TO_DIE_HARD_DVS815 | flash | | 1900 | 400 | | | | |
| A_GOOD_DAY_TO_DIE_HARD_DVS815 | flash | | 8300 | 1100 | | | | |
| A_GOOD_DAY_TO_DIE_HARD_DVS815 | light | | 9500 | 500 | | | | |
| A_GOOD_DAY_TO_DIE_HARD_DVS821 | wind | jet | 6000 | 14000 | 50 | | | |
| A_GOOD_DAY_TO_DIE_HARD_DVS821 | motion | jet | 13200 | 4500 | | | | |
| A_GOOD_DAY_TO_DIE_HARD_DVS821 | flash | | 15800 | 500 | | | all | red |
| A_GOOD_DAY_TO_DIE_HARD_DVS821 | light | | 16100 | 800 | 30 | | | red |

SENSORY INFORMATION PROVIDING APPARATUS, VIDEO ANALYSIS ENGINE, AND METHOD THEREOF

CROSS-REFERENCE TO RELATED APPLICATIONS

This application claims priority to Korean Patent Application No. 10-2017-0018978 filed on Feb. 10, 2017 in the Korean Intellectual Property Office (KIPO), the entire contents of which are hereby incorporated by reference.

BACKGROUND

1. Technical Field

The present disclosure relates to a sensory effect information providing apparatus, a video analysis engine, and a sensory effect information providing method, and more specifically, to a sensory effect information providing apparatus, a video analysis engine, and a sensory effect information providing method which provide sensory effect information by extracting the sensory effect information through a neural network learning model used for a deep learning.

2. Related Art

Demands for sensory media such as four-dimensional (4D) movies, holograms, and multi-view media are increasing, and interests in media production for it are also increasing. The motion picture expert group V (MPEG-V) standardization activities are also being developed in relation to technologies for providing sensory experience services based on the media. The sensory media production technology is a technology for producing the media by adding the MPEG-V international standard sensory effect metadata to the existing media. Also, a reproduction apparatus may reproduce sensory effects as synchronized with playback time of the media by parsing and analyzing the sensory effect metadata.

In case of production of the 4D movies which are typical sensory media, according to the related art, a media author views a movie repeatedly several times, determines sensory effects for a specific movie section, and generates sensory effect information corresponding to the determined sensory effects. As a result, despite the large demand for the 4D movies, there is a problem that the production of sensory media is not actively performed due to an increase in production cost and an increase in production time.

Meanwhile, techniques for automatically segmenting shots and scenes of a video through automated image analysis have appeared. However, they use simple image analysis based on, for example, screen switching without analyzing context information of the video. Thus, they cannot provide satisfactory sensory effects to users.

SUMMARY

Accordingly, embodiments of the present disclosure provide a sensory effect information providing apparatus based on a neural network learning model.

Accordingly, embodiments of the present disclosure also provide a video analysis engine based on a neural network learning model.

Accordingly, embodiments of the present disclosure also provide a sensory effect information providing method which can be used for the sensory effect information providing apparatus and the video analysis engine.

In order to achieve the objective of the present disclosure, a sensory information providing apparatus may comprise a learning model database storing a plurality of learning models related to sensory effect information with respect to a plurality of videos; and a video analysis engine generating the plurality of learning models by extracting sensory effect association information by analyzing the plurality of videos and sensory effect meta information of the plurality of videos, and extracting sensory information corresponding to an input video stream by analyzing the input video stream based on the plurality of learning model.

The sensory information may include sensory effect information and sensory effect association information, and the sensory effect information may include sensory effect types and sensory effect durations.

The sensory effect association information may include information on whether a sensory effect element is an object or an event, position information of the object or the event, and sensory effect supplementary information.

The sensory effect supplementary information may include at least one of intensity, direction, color, and scent of a sensory effect according to type of the sensory effect.

The video analysis engine may construct the learning model database by using the plurality of videos and the sensory effect meta information of the plurality of videos as training data.

The video analysis engine may further comprise a deep learning-based video analysis unit for separating video frames from the input video stream and outputting a video analysis result by extracting feature points of each of the video frames; and a sensory effect information analysis unit for extracting sensory effect information by using the video analysis result and the sensory effect meta information.

The video analysis engine may further comprise a sensory information extraction unit for generating sensory information by associating the sensory effect information with sensory effect elements, and transmitting the generated sensory information to a reproduction apparatus.

In order to achieve the objective of the present disclosure, a video analysis engine may comprise a deep learning-based video analysis unit for separating video frames from an input video stream and outputting a video analysis result by extracting feature points of each of the video frames; a sensory effect information analysis unit for extracting sensory effect information by using the video analysis result and sensory effect meta information; and a sensory information extraction unit for generating sensory information by associating the sensory effect information to sensory effect elements, and transmitting the generated sensory information to a reproduction apparatus.

The sensory effect information analysis unit may construct a learning model database by using a plurality of videos and the sensory effect meta information of the plurality of videos as training data by interoperating with the deep learning-based video analysis unit.

The sensory information may include sensory effect information and sensory effect association information, and the sensory effect information may include sensory effect types and sensory effect durations.

The sensory effect association information may include information on whether a sensory effect element is an object or an event, position information of the object or the event, and sensory effect supplementary information.

The sensory information extraction unit may further comprise an event recognition unit for recognizing an event which is a sensory effect element; an object recognition unit for recognizing an object which is a sensory effect element; and an association information extraction unit for extracting sensory effect association information by using the recognized object or event and the sensory effect meta information.

In order to achieve the objective of the present disclosure, a sensory effect information providing method may comprise constructing sensory effect information by analyzing a plurality of videos; receiving the constructed sensory effect information and the corresponding plurality of videos as learning data for deep learning; extracting feature points for each video frame in the plurality of videos; analyzing sensory effects through a time-series analysis on the feature points; extracting sensory effect association information using the sensory effect analysis result; and constructing a learning model database related to sensory information by using the sensory effect information and the sensory effect association information.

The method may further comprise comprising extracting objects or events which are sensory effect elements as the sensory effect analysis result.

The sensory information may include sensory effect information and sensory effect association information.

The sensory effect association information may include information on whether a sensory effect element is an object or an event, position information of the object or the event, and sensory effect supplementary information.

The sensory effect supplementary information may include at least one of intensity, direction, color, and scent of a sensory effect according to type of the sensory effect.

The method may further comprise updating the learning model database through repeated neural network learning.

The method may further comprise receiving an input video stream to be analyzed; determining whether the input video stream includes a sensory effect element; extracting sensory information according to the sensory effect element; and converting the extracted sensory information to data in form of sensory effect metadata (SEM), and transmitting the data to a reproduction apparatus.

The determining whether the input video stream includes a sensory effect element further may include extracting feature points of the input video stream; and extracting an object or event which is a sensory effect element.

According to the embodiments of the present disclosure as described above, it is possible to automatically extract the sensory information, which is indispensable for creating sensory media, from a target video. Therefore, it is made possible to solve problems such as an increase in cost and an increase in production time, which are caused by the conventional method which is performed by repetitive viewing and manual operation. Also, by using sensory effect information automatically extracted according to the present disclosure, effective motion effect extraction can be achieved by providing information on an object position that can be a starting point of motion tracking, etc.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

Figure 1:
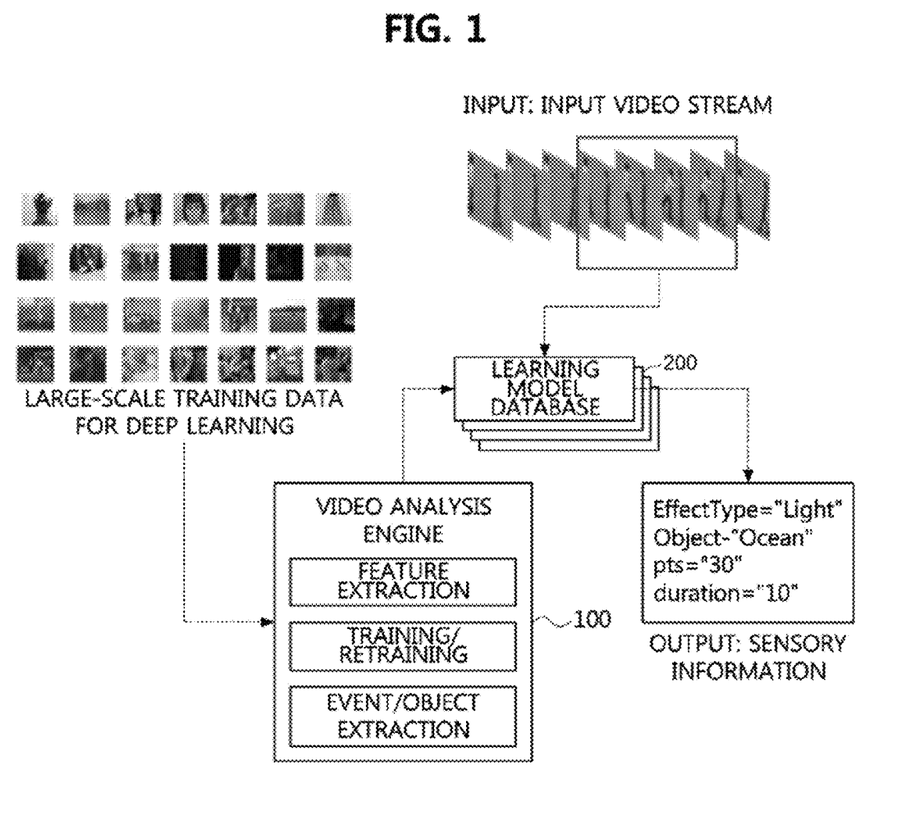
FIG. 1 is a conceptual diagram illustrating a neural network learning model-based sensory information providing apparatus according to an embodiment of the present disclosure.

FIG. 1 is a conceptual diagram illustrating a neural network learning model-based sensory information providing apparatus according to an embodiment of the present disclosure.

Referring to FIG. 1, a neural network learning model-based sensory information providing apparatus according to the present disclosure may comprise a learning model database 200 for storing a plurality of learning (training) models related to sensory effect information with respect to a plurality of videos, and a video analysis engine 100 for generating the plurality of learning models by extracting sensory effect association information by analyzing the plurality of videos and sensory effect meta information of the plurality of videos, and extracting sensory information corresponding to an input video stream by analyzing the input video stream based on the plurality of learning model.

The neural network learning model-based sensory information providing apparatus according to the present disclosure may learn (train) a sensory effect extraction model from training data (i.e., the plurality of videos and the sensory effect meta information of the plurality of videos) by using a neural network learning model used in deep learning, and automatically extract the sensory information for an input video stream through the learned (trained) model.

For this, the video analysis engine 100 according to the present disclosure may learn the sensory effect extraction model by using a large-scale video data as training data together with the sensory effect meta information, and extract the sensory information including sensory effect information for the input video stream from which sensory effects are to be extracted using the learned model. Here, the sensory effect information may include sensory effect types, sensory effect durations, and sensory effect attributes.

The information (i.e., the sensory information) extracted by the video analysis engine 100 according to the present disclosure through the learned (trained) model may include not only the sensory effect information but also sensory effect association information. The sensory effect association information may include information on whether corresponding sensory effect elements are events or objects, position information of objects or events, and sensory effect supplementary information, and may also include a mutual connection relationship between the pieces of information.

The term 'sensory information' used in the present disclosure may be a concept including the sensory effect information and the sensory effect association information. In addition, according to the present disclosure, it is possible to generate supplementary information (e.g., motion tracking, scent generating object, etc.) necessary for sensory media reproduction using object or event information.

The present disclosure is based on an environment for automatically extracting the sensory information for the sensory media such as 4D videos. The sensory information extraction environment according to the present disclosure may comprise the plurality of videos for large-scale training used for learning and validation, the sensory effect meta information extracted through analysis of a user, the video analysis engine 100 for constructing a neural network learning model based on the plurality of videos and the sensory effect meta information, and a learning model database generated as a result of execution of the video analysis engine 100 based on the training data (i.e., the plurality of videos and the sensory effect meta information). Due to the nature of the learning model, more accurate sensory effect information may be automatically extracted as the training data increases.

As shown in FIG. 1, the video analysis engine 100 according to the present disclosure may perform feature point extraction, training/retraining, event/object extraction, and the like based on deep learning.

More specifically, the video analysis engine 100 may separate video frames from a video for learning (training) and extract feature points for each video frame or segmented video to construct a learning data set for training the sensory effect extraction model. Meanwhile, sensory effect information (i.e., sensory effect meta information) of the video as well as the video itself may be input to the video analysis engine 100. The video analysis engine 100 may use the sensory effect meta information of the video and the video itself as training data to construct the sensory effect extraction model.

The video analysis engine 100 may learn the sensory effect extraction model using the learning data set, and automatically generate sensory effects for the input video stream by extracting feature points for the input video stream and extracting objects and events of the input video stream through the learned model. Here, the video analysis engine 100 may analyze the automatically-extracted feature points and extract sensory effect events and objects of the input video stream (e.g., a test video) using a neural network such as a recurrent neural network (RNN).

In order to learn the deep learning model that performs the sensory effect extraction function, a large-scale video data is required. In order to automatically classify sensory effects from a video composed of consecutive frames, feature points may be extracted for each frame and utilized as inputs to the deep learning model.

The training data of the deep learning model may include sensory effect types, sensory effect durations, sensory effect attributes, and sensory effect supplementary information (e.g., intensity, position, direction, color, etc.), and the like. Also, the task of constructing the learning data set may be performed based on user's determination through analysis of 4D movies and videos.

The video analysis engine 100 may use a part of the learning data as test data for validation in a learning phase, and segmented videos for which scene analysis is performed may be used as test data in an actual testing phase. The sensory effects automatically extracted based on the deep learning may be converted to extended markup language (XML) data in form of sensory effect metadata (SEM) used in the MPEG-V standard through an authoring tool, and finally presented to the user through a sensory effect reproduction apparatus such as a 4D chair or the like.

Figure 2:
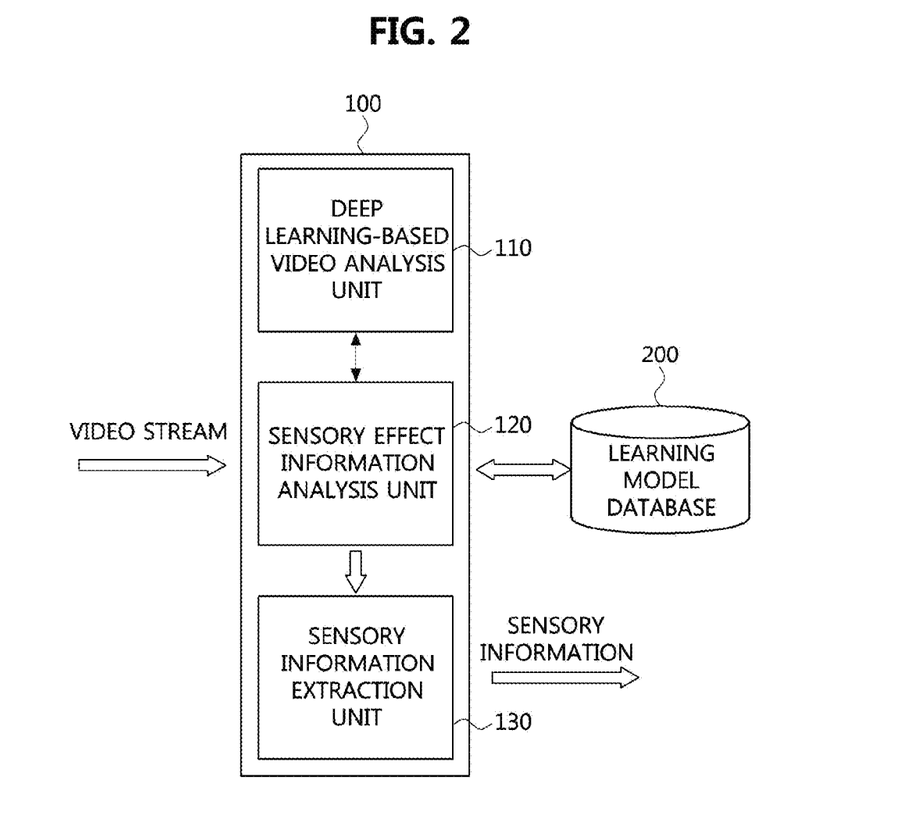
FIG. 2 is a block diagram illustrating a video analysis engine according to an embodiment of the present disclosure.

FIG. 2 is a block diagram illustrating a video analysis engine according to an embodiment of the present disclosure.

As explained referring to FIG. 1, the sensory information providing apparatus according to an embodiment of the present disclosure may comprise the video analysis engine 100 and the learning model database 200. Referring to FIG. 2, a detailed configuration of the video analysis engine will be described.

The video analysis engine 100 according to the present disclosure may comprise a deep learning-based video analysis unit 110, a sensory effect information analysis unit 120, and a sensory information extraction unit 130.

The deep learning-based video analysis unit 110 may output a video analysis result by separating an input video stream into video frames and extracting feature points of each video frame or segmented video, and the sensory effect information analysis unit 120 may extract sensory effect information using the video analysis result and the sensory effect meta information. Also, the sensory information extraction unit 130 may generate sensory information by associating the sensory effect information with sensory effect elements, and transmit the generated sensory information to a reproduction apparatus.

Specifically, the deep learning-based video analysis unit 110 may separate video frames from the input video stream and extract feature points for each video frame or segmented video to construct a learning data set for extracting sensory effects.

The sensory effect information analysis unit 120 may receive the video analysis result of the deep learning-based video analysis unit 110, extract sensory effect information using the video analysis result and sensory effect meta information of training videos and provide the extracted sensory effect information to the sensory information extraction unit 130. The data output by the sensory effect information analysis unit 120 may be text data including sensory effect types, sensory effect durations, sensory effect attributes, and the like.

The sensory information extraction unit 130 may generate sensory information by associating the sensory effect information output from the sensory effect information analysis unit 120 with sensory effect elements, and transmit the generated sensory information to the reproduction apparatus. The sensory information extraction unit 130 may convert the sensory information into an XML data in SEM form and transmit XML data to a sensory effect and video reproduction apparatus.

In the embodiment of FIG. 2, the video analysis engine 100 according to the present disclosure includes the deep learning-based video analysis unit 110, the sensory effect information analysis unit 120, and the sensory information extraction unit 130. However, the above configuration is merely an example, and embodiments, in which these components do not exist separately and exist as a single entity into which the separate components are incorporated, may also be possible.

Figure 3:
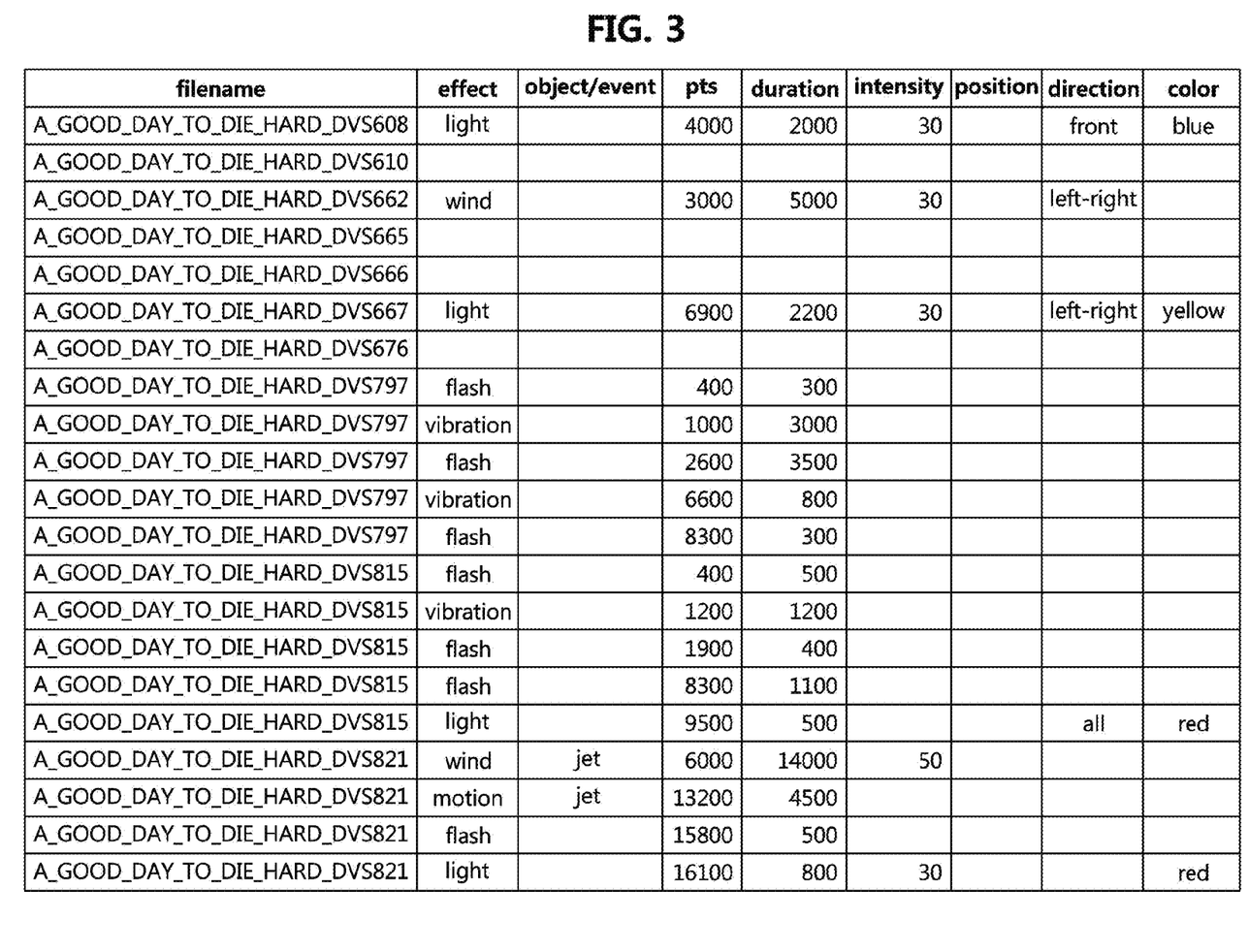
FIG. 3 is a diagram illustrating input and output data of a deep learning-based video analysis according to an embodiment of the present disclosure.

FIG. 3 is a diagram illustrating input and output data of a deep learning-based video analysis according to an embodiment of the present disclosure.

FIG. 3 shows an example of input and output data format of the deep learning-based video analysis according to the present disclosure.

Referring to FIG. 3, the input data may include file names of input videos, sensory effect types, sensory effect objects or events, sensory effect start time (e.g., pts in units of millisecond), sensory effect duration (e.g., duration in units of millisecond), sensory effect intensities, directions, and the like. Also, if the sensory effect type is a light effect, the input data may further include color information.

The input data for the deep learning-based video analysis according to the present disclosure may be referred to the sensory effect meta information, and the output data may be referred to as the sensory information according to the present disclosure.

The input data and the output data for the video analysis according to the present disclosure may be similar in shape but not the same. The output data, which is the result of the video analysis of the present disclosure, is the sensory information, and may additionally include position information of sensory effect objects or events in addition to the input data. That is, the positions of objects or events in video frames that cannot be expressed through a manual operation of the user may be information extracted through the video analysis engine according to the present disclosure, and thus not included in the input data input to the video analysis engine.

Among the sensory effect information, the sensory effect types may include light, flash, temperature, wind, vibration, air jet, water jet, fog, bubble, motion, scent, and the like.

The sensory effect start time (i.e., presentation time stamp (pts)) may represent a time at which an object appears or an event starts. The duration may represent a time taken from the sensory effect start time to a sensory effect end time (i.e., sensory effect duration). Here, units of the sensory effect start time pts and the duration are milliseconds.

The sensory effect objects or events may represent objects or events causing sensory effects, and in a motion effect, etc., they may be useful for a motion tracking. Here, a motion tracking algorithm according to types of the sensory effect objects and events may be used as a motion tracking algorithm for the motion tracking.

Also, the intensity of the sensory effect may be expressed as a percentage of 0 to 100%. The position information may have a different value depending on the sensory effect object or event. In the case of an object, two coordinate information indicating the position of the object may be used to indicate the position of the object. That is, the size and position of the object may be represented using the upper left coordinate (x1, y1) and the lower right coordinate (x2, y2). The color information corresponding to the illumination effect may be represented in red-green-blue (RGB) form through histogram analysis of the video frame.

Here, the event may be one of the elements causing sensory effects as an activity representing a specific section of a video. That is, the event may be one of the sensory effect elements according to the present disclosure. For example, an event such as a sunrise may be associated with a light effect, and an event such as earthquake and a car shake may be associated with a vibration effect.

Figure 8:
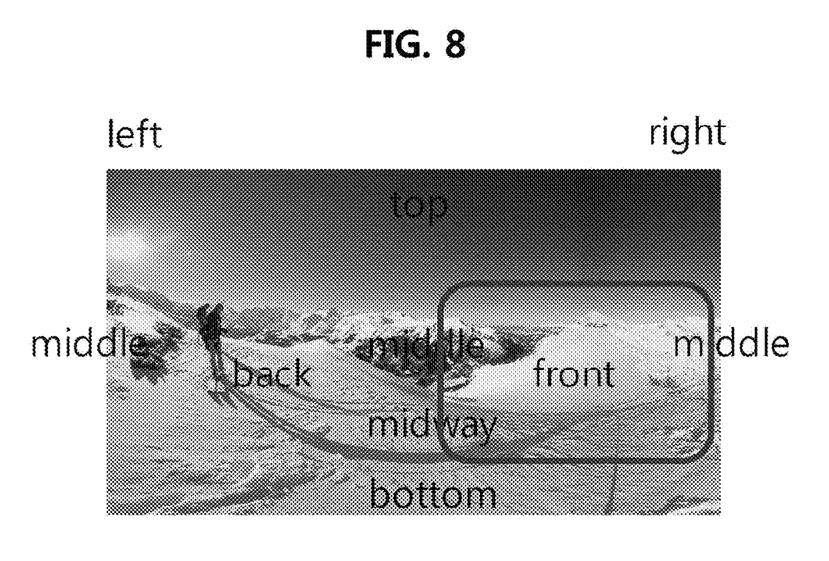
FIG. 8 is a conceptual diagram illustrating examples of event-related position information, which is one of sensory effect information according to the present disclosure.

FIG. 8 illustrates examples of event-related position information, which is one of sensory effect information according to the present disclosure.

As can be seen from an image of a skier shown in FIG. 8, the position of the event may be selected from left, center, right, front, midway, back, top, middle, bottom, and the like.

Figure 4:
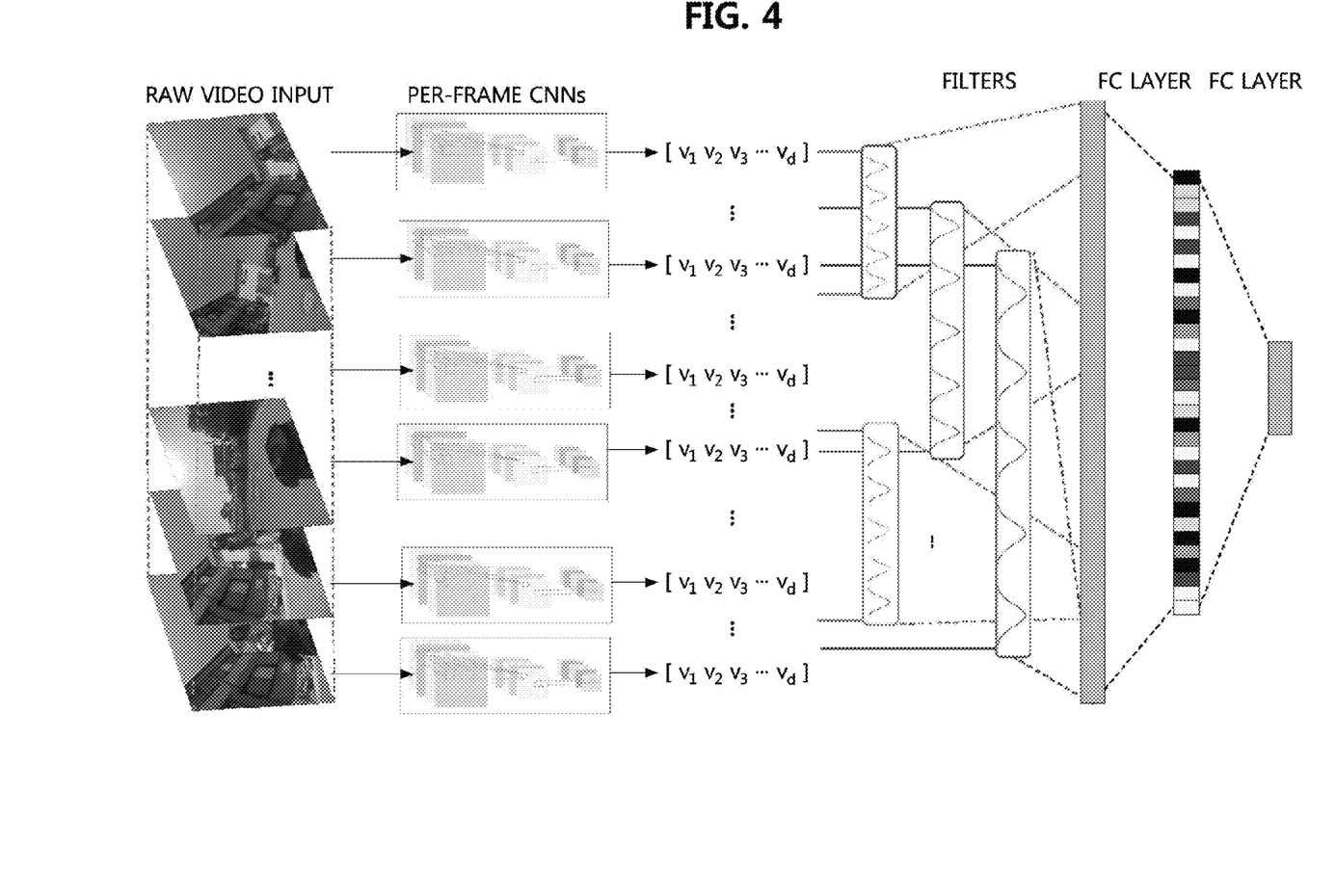
FIG. 4 is a diagram for explaining a concept of sensory information extraction based on a neural network learning model according to an embodiment of the present disclosure.

FIG. 4 is a diagram for explaining a concept of sensory information extraction based on a neural network learning model according to an embodiment of the present disclosure.

A neural network based learning model may be constructed by extracting feature points from data and learning the extracted feature points. As shown in FIG. 4, a neural network-based learning model according to the present disclosure may also be constructed through extraction of per-frame feature points. Here, a convolutional neural network (CNN) technique may be used to extract the feature points.

The CNN is a kind of multilayer perceptrons designed to use minimal preprocessing. The CNN is composed of one or several layers of convolutional layers and general artificial neural network layers on top of the convolutional layers, and utilize weighting and pooling layers additionally.

Meanwhile, an input video stream is composed of consecutive video frames, and classification of the whole input video stream may be performed by analyzing characteristics of the consecutive video frames in a time series manner. The time series data is data including a change with time. In the present disclosure, a continuous video may correspond to the time series data, and a recurrent neural network (RNN) or the like may be used for a deep learning for the time series data.

The RNN may refer to a neural network in which connections between units constituting an artificial neural network form a directed cycle. The RNN is being used in fields such as handwriting recognition and exhibit high recognition rates.

As shown in FIG. 4, a learning model according to the present disclosure may be composed of several layers, and respective layers are subjected to procedures such as convolution, pooling, temporal attention, etc. Also, parameters for learning, such as weights, may be changed through back propagation or the like. In a learning phase, the learning model may be verified by classifying some data used for learning into validation purposes. By applying the model generated through the learning to the input video subjected to extraction of sensory effects, sensory effects may be automatically extracted from the input video, and sensory effect types, sensory effect events or objects, sensory effect durations, sensory effect supplementary information (intensity, position, direction, color), etc. may be generated as outputs.

Embodiments of the present disclosure may be implemented using various algorithms such as CNN and RNN, and models such as VGG and C3D may be used for extraction of feature points. Also, various techniques for RNN learning, such as a long-short term memory (LSTM), temporal attention filters, and the like, may be used, but the embodiments of the present disclosure are not limited to specific neural network algorithms and models.

In summary, in the neural network learning model-based sensory information extraction method according to the present disclosure, feature points may be extracted from the input video on a frame basis, sensory effect types of the input video may be classified and sensory effect durations may be extracted through time series analysis on the extracted feature points, sensory effect objects and events may be identified through video analysis, and sensory effect supplementary information (e.g., intensity, position, direction, etc.) of the objects and events may be extracted.

Figure 5:
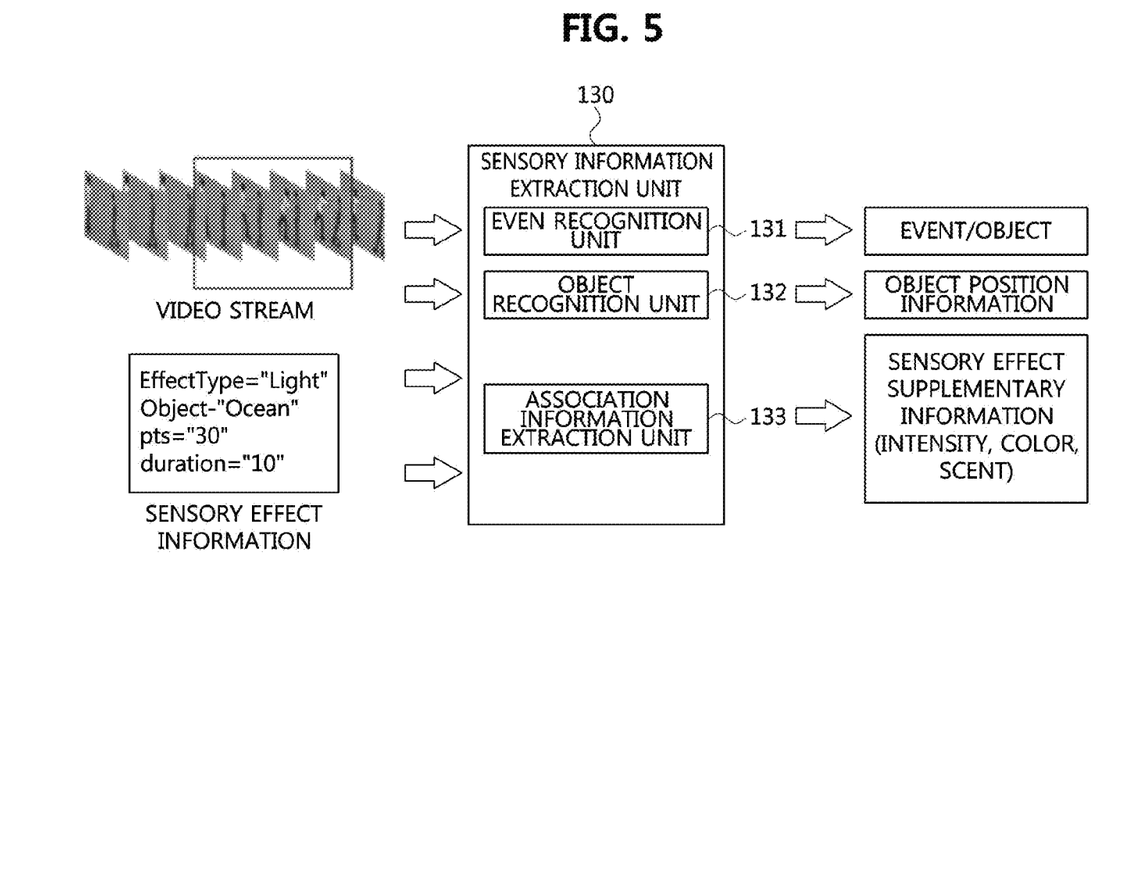
FIG. 5 is a block diagram illustrating a sensory information extraction unit according to an embodiment of the present disclosure.

FIG. 5 is a block diagram illustrating a sensory information extraction unit according to an embodiment of the present disclosure.

As explained referring to FIG. 2, the deep learning-based video analysis unit 110 in the video analysis engine may separate an input video stream into video frames, extract feature points for each video frame or segmented video, and the sensory effect information analysis unit 120 may extract sensory effect information by using a video analysis result and sensory effect meta information of the input video stream.

The sensory information extraction unit 130 may generate the sensory information using the video analysis result and the sensory effect information in cooperation with the deep learning based video analysis unit 110 and the sensory information analysis unit 120, and may comprise an event recognition unit 131, an object recognition unit 132, and an association information extraction unit 133.

Specifically, the sensory information extraction unit 130 may comprise the event recognition unit 131 for recognizing events to be sensory effect elements from the video analysis result, the object recognition unit 132 for recognizing objects to be sensory effect elements from the video analysis result, and the association information extraction unit 133 for extracting sensory effect association information using the recognized events or objects and the sensory effect meta information.

The event recognition unit 131 may recognize events included in the input video stream, that is, events to be sensory effect elements, and output information on the events (referred to as 'event information').

The object recognition unit 132 may recognize objects included in the input video stream, that is, objects to be sensory effect elements, and output information on the objects (referred to as 'object information').

The association information extraction unit 133 may extract sensory effect association information based on the event information, the object information, context information related to sensory effects, the video analysis result, etc. The sensory effect association information may include information on whether a corresponding sensory effect element is an event or an object, position information of the object or the event, and sensory effect supplementary information, and may also include a mutual connection relationship between the pieces of information.

Here, the context information may be context information of the corresponding video stream, which is extracted as the video analysis result and is meaningful in terms of time and space. For example, when an object (for example, a tennis racket) positioned at the lower right of a previous video frame in a video moves to the upper left area through several video frames, the video is analyzed as including an operation of (tennis) swing, and this analysis information may be the context information.

When the recognized object is determined to be an object that is a sensory effect element, the association information extraction unit 133 may extract the sensory effect supplementary information such as intensity, color, scent, or the like related to the object based on the position information of the object recognized by the object recognition unit 132, the video analysis result, and the context information.

In the embodiment of FIG. 5, the sensory information extraction unit 130 according to the present disclosure was described as including the event recognition unit 131, the object recognition unit 132, and the association information extraction unit 133. However, embodiments where at least two of the detailed sub components are integrated into a single entity are also within the scope of the present disclosure.

Figure 6:
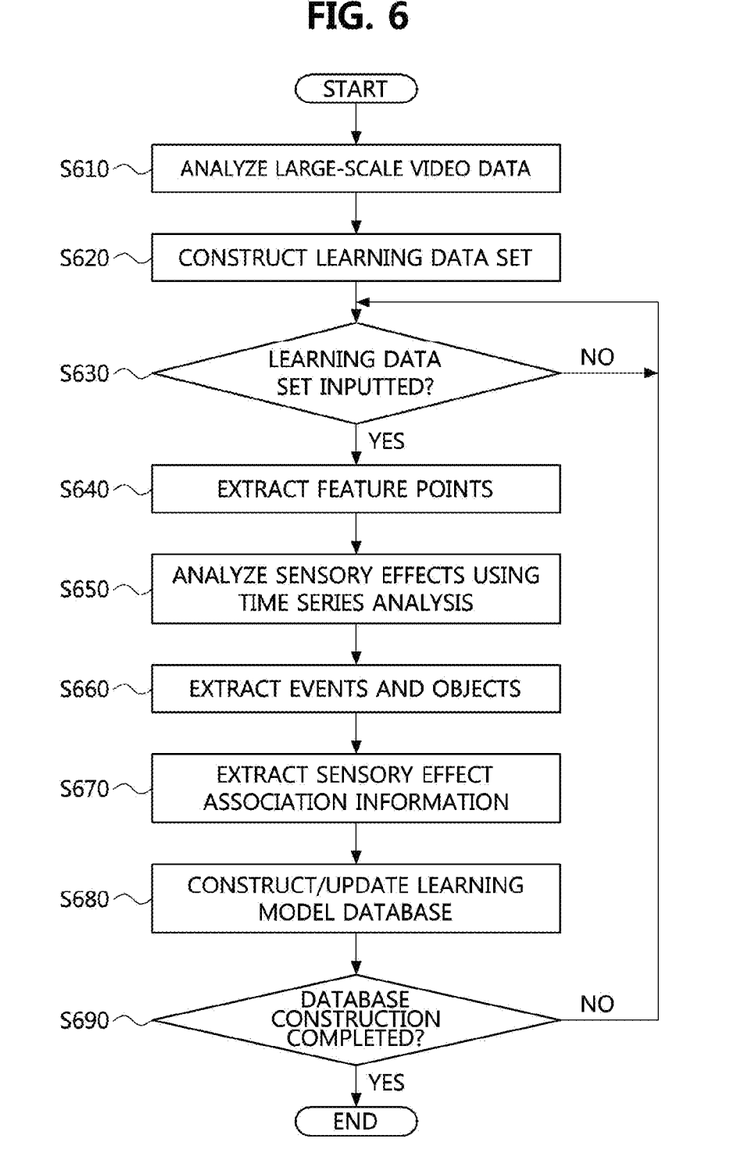
FIG. 6 is an operational flowchart for explaining a method for constructing a learning model database according to an embodiment of the present disclosure.

FIG. 6 is an operational flowchart for explaining a method for constructing a learning model database according to an embodiment of the present disclosure.

The method for constructing a learning model database illustrated in FIG. 6 may be performed by the image analysis engine 100 shown in FIG. 1, but embodiments of the present disclosure are not limited thereto.

In order to perform the deep learning based learning according to embodiments of the present disclosure, large-scale learning data is required. For this, a large-scale video data may be analyzed (S610) so that a learning data set may be constructed (S620). When the constructed learning data set and the corresponding videos are input as deep learning data (S630), a neural network learning model may be constructed using the same.

First, feature points of respective video frames in the learning data set may be extracted (S640). Here, as a model for extraction of the feature points, models such as VGG, C3D, and TDD may be used.

The extracted feature points may analyzed in a time series manner with respect to consecutive frames to analyze sensory effects (S650). As a result of the sensory effect analysis, sensory effect objects or events may be extracted (S660). When the objects or events are extracted, sensory effect association information may be extracted using context information and video analysis information (S670). Here, the sensory effect association information may include information on whether the corresponding sensory effect elements are the events or objects, position information of the objects or events, and sensory effect supplementary information, and may also include a mutual connection relationship between the respective pieces of information.

The above steps S630 to S680 may be repeated and updated until the database construction is completed (S690). That is, a learning model for extracting sensory effect information according to the present disclosure may be constructed by correcting weights, biases, etc. through the repeated neural network learning.

As explained referring to the embodiment shown in FIG. 6, the deep learning-based video analysis engine according to the present disclosure may generate a model for automatically extracting sensory effects for an input video stream by performing the neural network model-based learning based on video feature point data, video data, and sensory effect data extracted from the training data. By applying the input data to an initial baseline model and learning and correcting information such as predictions, errors, and probabilities, a model that predicts a desired output may be developed.

Figure 7:
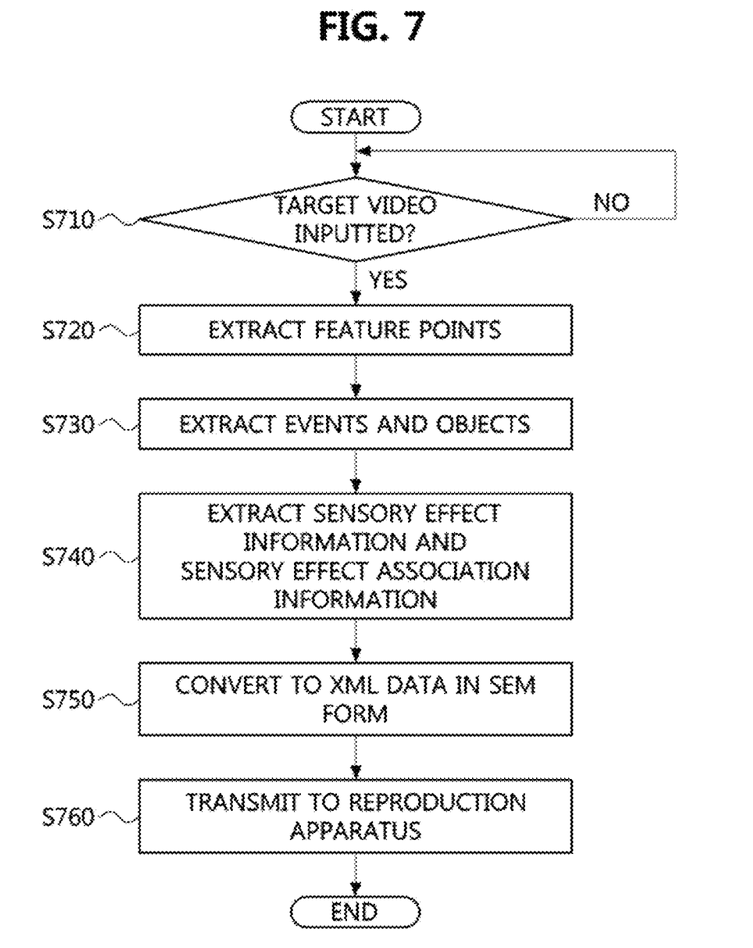
FIG. 7 is an operational flowchart for explaining a method for extracting and providing sensory information on an input video according to an embodiment of the present disclosure.

FIG. 7 is an operational flowchart for explaining a method for extracting and providing sensory information on an input video according to an embodiment of the present disclosure.

The sensory information providing method shown in FIG. 7 may be performed by the video analysis engine 100 shown in FIG. 1, but embodiments of the present disclosure are not limited thereto.

The sensory information providing method shown in FIG. 7 may be configured to include operations performed when an input video (e.g., a test video) is given, assuming that the learning model database has been already constructed through the embodiment of FIG. 6.

The sensory information providing method according to an embodiment of the present disclosure may comprise a step of receiving a video stream to be analyzed, a step of determining whether the video stream to be analyzed includes sensory effect elements (i.e., objects or events), a step of extracting sensory information according to the sensory effect elements (i.e., sensory effect information and sensory effect association information), and a step of converting the extracted sensory information into data in SEM form and delivering the data to a reproduction apparatus.

Specifically, in the sensory information providing method according to an embodiment of the present disclosure, when the input video (i.e., target video) is input (S710), feature points of the input video may be extracted (S720), and objects or events which are sensory effect elements may be extracted from the input video (S730). When the objects and events which are sensory effect elements are extracted, sensory effect information and sensory effect association information related with the extracted objects and events may be extracted (S740). The extracted sensory information may be converted into XML data in SEM form (S750), and the sensory information may be transmitted to the reproduction apparatus realizing the sensory effect (S760).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

While the embodiments of the present disclosure and their advantages have been described in detail, it should be understood that various changes, substitutions and alterations may be made herein without departing from the scope of the present disclosure.

What is claimed is:

1. A sensory information providing apparatus comprising:
a learning model database storing a plurality of learning models related to sensory effect information with respect to a plurality of videos; and
a video analysis engine generating the plurality of learning models by extracting sensory effect association information by analyzing the plurality of videos and sensory effect meta information of the plurality of videos, and extracting sensory information corresponding to an input video stream by analyzing, using the plurality of learning models, the input video stream,
wherein the extracted sensory information is converted to eXtended Markup Language (XML) data in form of sensory effect metadata (SEM) used in the Motion Picture Expert Group V (MPEG-V) standard and is provided to a sensory effect reproduction apparatus.

2. The sensory effect information providing apparatus according to claim 1, wherein the sensory information includes sensory effect information and sensory effect association information, and the sensory effect information includes sensory effect types and sensory effect durations.

3. The sensory effect information providing apparatus according to claim 2, wherein the sensory effect association information includes information on whether a sensory effect element is an object or an event, position information of the object or the event, and sensory effect supplementary information.

4. The sensory effect information providing apparatus according to claim 3, wherein the sensory effect supplementary information includes at least one of intensity, direction, color, and scent of a sensory effect according to type of the sensory effect.

5. The sensory effect information providing apparatus according to claim 1, wherein the video analysis engine constructs the learning model database using the plurality of videos and the sensory effect meta information of the plurality of videos as training data.

6. The sensory effect information providing apparatus according to claim 1, wherein the video analysis engine further comprises:
a deep learning-based video analysis unit for separating video frames from the input video stream and outputting a video analysis result by extracting feature points of each of the video frames; and
a sensory effect information analysis unit for extracting sensory effect information by using the video analysis result and the sensory effect meta information.

7. The sensory effect information providing apparatus according to claim 6, wherein the video analysis engine further comprises:
a sensory information extraction unit for generating sensory information by associating the sensory effect information with sensory effect elements, and transmitting the generated sensory information to a reproduction apparatus.

8. A video analysis engine comprising:
a deep learning-based video analysis unit for separating video frames from an input video stream and outputting a video analysis result by extracting, using a neural network, feature points of each of the video frames;
a sensory effect information analysis unit for extracting, using a trained sensory effect extraction model database, sensory effect information by using the video analysis result; and
a sensory information extraction unit for generating sensory information by associating the sensory effect information to sensory effect elements, and transmitting the generated sensory information to a reproduction apparatus,
wherein the extracted sensory information is converted to eXtended Markup Language (XML) data in form of sensory effect metadata (SEM) used in the Motion Picture Expert Group V (MPEG-V) standard and is provided to a sensory effect reproduction apparatus.

9. The image analysis engine according to claim 8, wherein the sensory effect information analysis unit constructs sensory effect extraction model database by using a plurality of videos and sensory effect meta information of the plurality of videos as training data by interoperating with the deep learning-based video analysis unit.

10. The image analysis engine according to claim 8, wherein the sensory information includes sensory effect information and sensory effect association information, and the sensory effect information includes sensory effect types and sensory effect durations.

11. The image analysis engine according to claim 10, wherein the sensory effect association information includes information on whether a sensory effect element is an object or an event, position information of the object or the event, and sensory effect supplementary information.

12. The image analysis engine according to claim 8, wherein the sensory information extraction unit further comprises:

an event recognition unit for recognizing an event which is a sensory effect element;
an object recognition unit for recognizing an object which is a sensory effect element; and
an association information extraction unit for extracting sensory effect association information by using the recognized object or event and the sensory effect meta information.

13. A sensory effect information providing method comprising:
constructing sensory effect information by analyzing a plurality of videos;
receiving the constructed sensory effect information and the corresponding plurality of videos as learning data for deep learning;
extracting feature points for each video frame in the plurality of videos;
analyzing sensory effects through a time-series analysis on the feature points;
extracting sensory effect association information using the sensory effect analysis result; and
constructing a learning model database related to sensory information by using the sensory effect information and the sensory effect association information,
wherein the extracted sensory information is converted to eXtended Markup Language (XML) data in form of sensory effect metadata (SEM) used in the Motion Picture Expert Group V (MPEG-V) standard and is provided to a sensory effect reproduction apparatus.

14. The sensory effect information providing method according to claim 13, further comprising extracting objects or events which are sensory effect elements as the sensory effect analysis result.

15. The sensory effect information providing method according to claim 13, wherein the sensory information includes sensory effect information and sensory effect association information.

16. The sensory effect information providing method according to claim 15, wherein the sensory effect association information includes information on whether a sensory effect element is an object or an event, position information of the object or the event, and sensory effect supplementary information.

17. The sensory effect information providing method according to claim 16, wherein the sensory effect supplementary information includes at least one of intensity, direction, color, and scent of a sensory effect according to type of the sensory effect.

18. The sensory effect information providing method according to claim 13, further comprising updating the learning model database through repeated neural network learning.

19. The sensory effect information providing method according to claim 13, further comprising:
receiving an input video stream to be analyzed;
determining whether the input video stream includes a sensory effect element; and
extracting, using the learning model database, sensory information according to the sensory effect element.

20. The sensory effect information providing method according to claim 19, wherein the determining whether the input video stream includes a sensory effect element further includes:
   extracting feature points of the input video stream; and
   extracting an object or event which is a sensory effect element.

\* \* \* \* \*